United States Patent [19]
Ogisu

[11] 3,976,307
[45] Aug. 24, 1976

[54] MEANS FOR PREVENTING THE DETACHMENT OF THE FRONT WHEEL FROM A BICYCLE

[75] Inventor: Noriyuki Ogisu, Tokyo, Japan

[73] Assignee: Nichibei Fuji Cycle Co., Ltd., Tokyo, Japan

[22] Filed: Apr. 1, 1975

[21] Appl. No.: 563,977

[52] U.S. Cl. .................................. 280/279; 151/35
[51] Int. Cl.² ......................................... B62K 25/00
[58] Field of Search ........................... 280/279, 278; 74/242.12 B; 151/35, 46, 41.75

[56] References Cited
UNITED STATES PATENTS

| 524,951 | 8/1894 | Perkins | 74/242.14 B |
| 624,442 | 5/1899 | Baker | 280/279 |
| 1,545,171 | 7/1925 | Schulz | 74/242.14 B |
| 2,925,292 | 2/1960 | Hirschle | 151/46 X |
| 3,507,516 | 4/1970 | Fritz | 280/279 |
| 3,610,659 | 10/1971 | Gerarde | 280/279 |
| 3,807,761 | 4/1974 | Brilando | 280/279 |
| 3,894,751 | 7/1975 | Fuhrman | 280/279 |

Primary Examiner—M. H. Wood, Jr.
Assistant Examiner—Terrance L. Siemens
Attorney, Agent, or Firm—Toren, McGeady and Stanger

[57] ABSTRACT

To prevent the detachment of the front wheel of a bicycle from the front fork formed of a pair of laterally spaced fork arms each having a free end with an open ended slot arranged to receive the hub spindle of the front wheel which is secured to the front fork by washers and hub nuts, the slot is shaped to have at least one portion which is positioned at the place occupied by the hub spindle when it is assembled within the front fork, that is, at the back of the slot, and which is wider than the diameter of the hub spindle and the washer is provided with a hole arranged to receive the hub spindle therein and at least one projection extending from one of its faces along the periphery of the hole. The projections are fitted into the widened portions of the slots so that even though the nuts securing the front wheel to the front fork become loose, the projections of the washers are retained in the corresponding slots in the front fork preventing the detachment of the front wheel.

1 Claim, 9 Drawing Figures

MEANS FOR PREVENTING THE DETACHMENT OF THE FRONT WHEEL FROM A BICYCLE

BACKGROUND OF THE INVENTION

The present invention relates to an arrangement for preventing the detachment of the front wheel of a bicycle from the front fork and, more particularly, it concerns the arrangement of the front fork of a bicycle so that the front wheel is prevented from disengagement from the slots in the fork arms of the front fork when the nuts which secure the wheel hub to the front fork become loose.

Conventionally, the front wheel is attached to the front fork with the hub spindle secured within slots in the free ends of the fork arms and hub nuts threaded onto the spindle into contact with the outwardly facing surfaces of the fork arms.

The abovementioned conventional means are quite dangerous because the hub spindle may become disengaged from the slots in the fork arms when the hub nuts become loose. It is noted that various means to get rid of such a danger have been proposed and, however, no satisfactory means can be found among them.

SUMMARY OF THE INVENTION

It is an object of the present invention to provide an arrangement which prevents the front wheel of a bicycle from becoming disengaged though the nuts securing it in place become loose. More specifically, a portion or portions in the back of the slot, which is formed in each of the free ends of the front fork arms for receiving the hub spindle of the front wheel, that is, at the place occupied by the hub spindle onto which the hub nuts are screwed, are wider than the rest thereof providing a gap or gaps between the free end of the fork arm and the hub spindle and each of the washers provided with the holes arranged to receive the hub spindle therein and secured against the outer surfaces of the fork arms by the hub nuts is shaped to provide a portion or portions protruding from one of its faces along the periphery of the hole.

In one embodiment of the present invention, each washer is shaped to provide a protruding portion along the whole periphery of the hole which receives the hub spindle therein and the back of the slot in each of the fork arms are substantially circular each having a diameter sufficient to receive the protruding portion of the washer therein and being centered about the axis of the slot extending into the fork arm from its free end.

In another embodiment of the present invention, each of the washers having the holes adapted to receive the hub spindle and secured against the fork arms by the hub nuts is shaped to provide projections along parts of the periphery of the hole, for example, at two parts diametrically facing each other, said projections extending from a side of the washer, and the back of each slot in the fork arm is provided with outwardly extending cuts which are formed correspondingly to the projections of the washer so that the projections are fitted into the cuts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
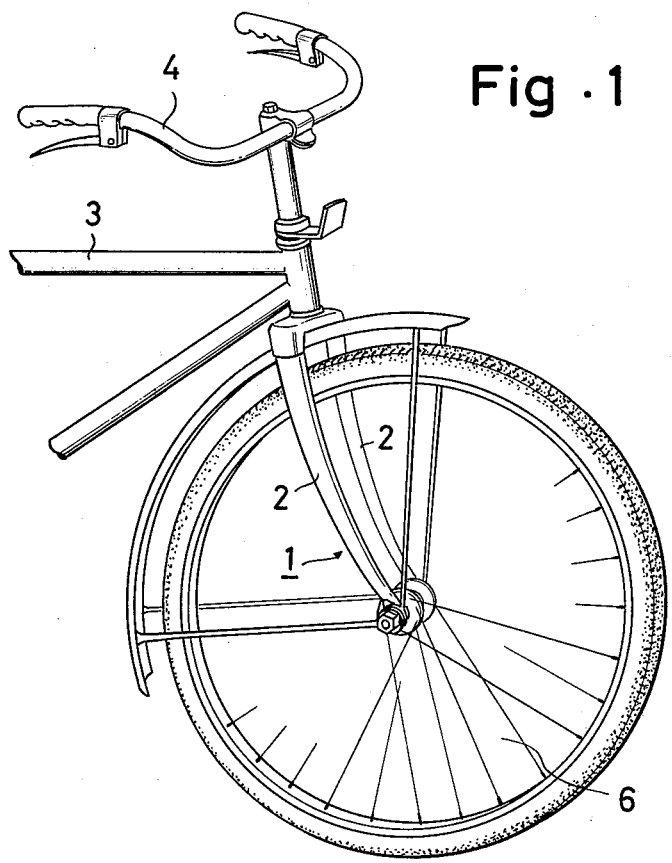
FIG. 1 is a perspective view illustrating the front wheel portion of a bicycle.

In FIG. 1 the front portion of a bicycle is illustrated and includes a front fork 1 having a pair of fork blades or arms 2 and a fork stem extending upwardly above the arms, which is inserted into the head tube of a frame 3 and, in turn, connected to a handle stem of a handle 4.

Figure 2:
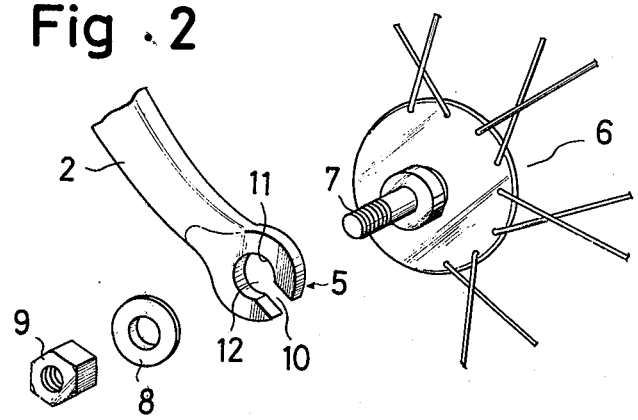
FIG. 2 is an exploded perspective view showing the various parts involved, in assembling the front wheel within one of the arms of the front fork.

As shown in FIG. 2, the lower or free end 5 of each fork arm contains an open ended slot 10. A front wheel 6 is fixed into each of the slots 10 in the free ends of the fork arms 2, that is, a hub spindle 7 of the wheel extends transversely through the slot in each of the fork arms with washers 8 secured against the outer surface of the fork arm by a hub nut 9.

Figure 3:
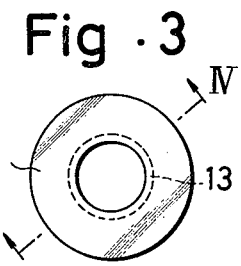
FIG. 3 is an elevational side view of the washer.
Figure 4:
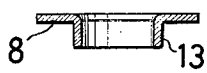
FIG. 4 is a sectional view taken on line IV—IV of FIG. 3.

The present invention is characterized by the slots 10 formed in the free ends 5 of the fork arms and the washers 8 secured by the hub nuts 9. As can be seen in FIG. 2, each of the slots 10 in the free ends of the fork arms has a widened portion at its back, namely, at the place occupied by the hub spindle 7 when it is usually fitted into the slot 10. More in detail, the slot 10 includes a substantially circular portion 11 greater than the rest, said circular portion being centered about the axis of the slot 10 extending into the fork arm from its free end 5 of the front fork arm 2. As shown in FIGS. 3 and 4, moreover, along the periphery of a hole 12 formed in each of the washers 8 and serving to receive the hub spindle 7 is provided a portion 13 protruding from one of the faces of the washer, said protruding portion 13 being formed by press upon manufacture of the washer. The protruding portion 13 of the washer 8 is fitted into said widened portion 11 of the slot 10.

Figure 5:
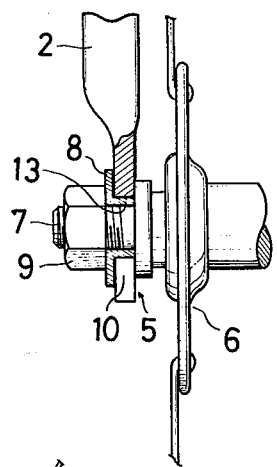
FIG. 5 is a front elevational view, partly in section, illustrating the assembly of the parts shown in FIG. 2.
Figure 6:
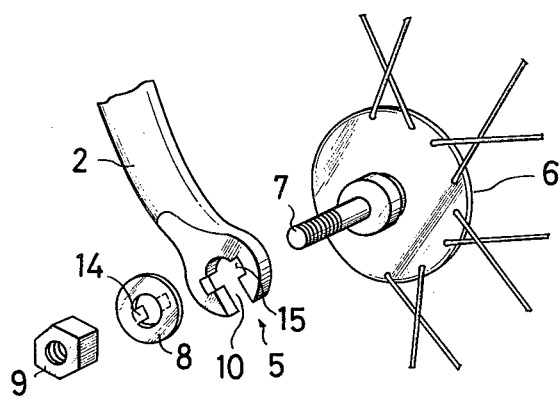
FIG. 6 is an exploded perspective view, similar to FIG. 2, according to another embodiment of the invention, in assembling the front wheel within one of the arms of the front fork.
Figure 7:
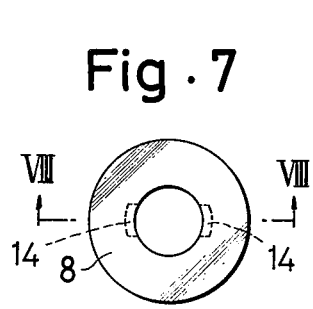
FIG. 7 is an elevational side view of the washer shown in FIG. 6.
Figure 8:
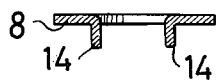
FIG. 8 is a sectional view taken on line VIII—VIII of FIG. 7.
Figure 9:
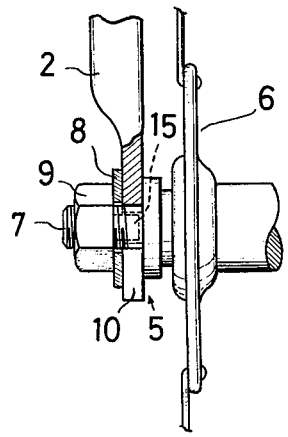
FIG. 9 is a view similar to FIG. 5, illustrating the assembly of the parts shown in FIG. 6.

Owing to such a way of the assembly that the hub spindle 7 is positioned within the free ends 5 of the fork arms 2, then the protruding portions 13 of the washers 8 are put into the widened portions 11 of the corresponding slots 10 and then the hub nuts 9 are tightened onto the spindle 7 (See FIG. 5), the front wheel does not become disengaged from the front fork as long as the protruding portions 13 of the washers 8 remain in engagement with the widened portions 11 of the corresponding slots 10 each formed in the free end 5 of the fork arm even if the hub nuts 9 become loose axially of the hub spindle 7.

A detailed description of the second embodiment illustrated in FIGS. 6, 7, 8 and 9 is not provided because it is similar to the embodiment in FIGS. 2, 3, 4 and 5, except for the shape of the washer 8 and that of the slot 10 formed in the free end 5 of the front fork arm 2.

According to the second embodiment, projections 14 extending from a surface of each washer 8 are provided along the periphery of the hole 12, for example, at two parts of said periphery diametrically opposite to each other and outwardly extending cuts 15 which are shaped correspondingly to the shape of said projections 14 of the washers are provided to the slot 10 in the free end 5 of the front fork arm 2.

The parts of the second embodiment are assembled in such a manner that the hub spindle 7 is first inserted into the slots 10, providing gaps formed by the cuts 15 of the slots and then after fitting the projections 14 of the washers 8 into said gaps, the hub nuts 9 are threaded onto the spindle so that the washers are secured in position. Due to this way of the assembly, if the hub nuts 9 move axially of the hub spindle 7 to become loose, the front wheel is prevented from disengagement from the front fork arms as long as the projections 14 of the washers 8 are held in the cuts 15 of the slots 10.

It should be understood from the foregoing description that the present invention provides a bicycle in which the washers and the slots in the free ends of the front fork arms are improved in their shapes so as to prevent the front wheel from disengagement from the front fork arms even though the hub nuts accidentally become loose. From such a fact that the improvement in the washers is obtained by making the protruding portions or the projections by press upon manufacture of the washers and that the slots in the free ends of the front fork may be easily varied by a change of trimming dies therefor, it will be noted that the washers and the front fork arms of the present invention are made in the conventional manners and there is no change in the number of the parts. To conclude, the present invention provides a best and satisfactory means for preventing the detachment of the front wheel of a bicycle.

While specific embodiments of the invention have been shown and described in detail to illustrate the application of the inventive principles, it will be understood that the invention may be embodied otherwise without departing from such principles.

What is claimed is:

1. A front fork assembly for a bicycle including a front fork and a bicycle front wheel for preventing the detachment of said front wheel from said front fork, said front fork comprising a pair of elongated laterally spaced fork arms each having a free end, each said fork arm having an open-ended slot extending into said fork arm in the elongated direction thereof from the free end thereof, said front wheel having a hub spindle arranged to fit into and extend through said open-ended slot, said hub spindle comprising a threaded circular exterior surface located within and extending through said open-ended slot, means for securing said front wheel in said front fork comprising hub nuts and washers, each said washer having a circular opening therethrough for closely fitting about said circular surface of said hub spindle, said washer having a first surface arranged to face toward said front wheel when it is mounted in said front fork and an oppositely directed second surface, said slot having a pair of facing surfaces extending inwardly from the free end of said fork arm with said first facing surfaces being spaced apart by the diametrical dimension of said hub spindle so that said hub spindle can be passed through said slot between said facing surfaces, said slot having an inner end portion located at the opposite end thereof from the open end and arranged to seat said hub spindle, each of said facing surfaces of said slot at the inner end portion thereof having cutouts extending outwardly from said facing surfaces, projections formed on and projecting outwardly from the first surface of said washer, and said projections located on diametrically opposite sides of the circular opening through said washer and being shaped to formfit into said cutouts in said facing surfaces of said slot for securing said washer to said fork arm.

* * * * *